US012122163B2

(12) United States Patent
Lake et al.

(10) Patent No.: US 12,122,163 B2
(45) Date of Patent: Oct. 22, 2024

(54) SYSTEM AND METHOD FOR STORING PRINTHEAD CLEANING MODULES IN A PRINT ZONE OF AN INKJET PRINTER

(71) Applicant: Xerox Corporation, Norwalk, CT (US)

(72) Inventors: Joshua E. Lake, Portland, OR (US); Steven R. Slotto, Washougal, WA (US); Chad J. Slenes, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 212 days.

(21) Appl. No.: 18/050,020

(22) Filed: Oct. 26, 2022

(65) Prior Publication Data

US 2024/0140099 A1 May 2, 2024

(51) Int. Cl.
*B41J 2/165* (2006.01)

(52) U.S. Cl.
CPC ................................. *B41J 2/16535* (2013.01)

(58) Field of Classification Search
CPC ......................... B41J 2/16535; B41J 2/16538; B41J 2/16544; B41J 2002/16591
See application file for complete search history.

(56) References Cited

U.S. PATENT DOCUMENTS

| | | | | |
|---|---|---|---|---|
| 6,837,636 | B2 | 1/2005 | Sawyer et al. | |
| 6,929,346 | B2 | 8/2005 | Balcan et al. | |
| 7,862,146 | B2 | 1/2011 | Berry et al. | |
| 9,676,196 | B1 | 6/2017 | Raoust | |
| 10,518,537 | B1 | 12/2019 | Praharaj et al. | |
| 2015/0251431 | A1 * | 9/2015 | Cessel | B41J 2/155 347/33 |
| 2021/0347174 | A1 * | 11/2021 | Ueno | B41J 2/16547 |
| 2022/0048298 | A1 | 2/2022 | Sahun Peres et al. | |
| 2022/0097381 | A1 * | 3/2022 | Shimomura | B41J 2/16585 |

* cited by examiner

*Primary Examiner* — Scott A Richmond
(74) *Attorney, Agent, or Firm* — Maginot Moore & Beck LLP

(57) ABSTRACT

An inkjet printer includes one or more printhead maintenance stations. Each station is positioned within the print zone of the inkjet printer and includes at least one printhead cleaning module. The at least one printhead cleaning module is configured to move from a first position that is not between the media transport and the at least one printhead to a second position where the at least one printhead cleaning module is between the at least one printhead and the media transport.

20 Claims, 12 Drawing Sheets

SYSTEM AND METHOD FOR STORING PRINTHEAD CLEANING MODULES IN A PRINT ZONE OF AN INKJET PRINTER

TECHNICAL FIELD

This disclosure relates generally to devices that produce ink images on media, and more particularly, to the printhead maintenance stations within those devices.

BACKGROUND

Inkjet imaging devices, also known as inkjet printers, eject liquid ink from printheads to form images on an image receiving surface. The printheads include a plurality of inkjets that are arranged in an array. Each printhead includes a manifold that is coupled at one end of the manifold to an ink supply. A heater extends the length of the manifold to heat the ink as the ink flows from the end coupled to the ink supply to the opposite end of the manifold where the ink moves through the printhead to supply the inkjets. Each inkjet has a thermal or piezoelectric actuator that is coupled to a printhead controller. The printhead controller generates firing signals that correspond to digital data content for the images to be printed. The actuators in the inkjets respond to the firing signals by expanding into an ink chamber of the inkjet to eject ink drops from the ink chamber and through a nozzle onto an image receiving surface and form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that usually eject a single color of ink. In a typical inkjet color printer, four printhead modules are positioned in a process direction with each printhead module ejecting a different color of ink. As used in this document, the term "process direction" means the direction of movement of the image receiving surface as it passes the printheads in the printer. The four ink colors most frequently used are cyan, magenta, yellow, and black. The common nomenclature for printers configured with printhead modules that eject these four colors of ink is CMYK color printers. Some CMYK printers have two printhead modules for each color of ink. The printhead modules that print the same color of ink are offset from each other by one-half of the distance between adjacent inkjets in a cross-process direction to double the number of pixels per inch of a line of the color of ink ejected by the printheads in the two modules. As used in this document, the term "cross-process direction" means a direction that is perpendicular to the process direction in the plane of the image receiving surface.

Some of the ink ejected from the inkjets in the printheads adheres to the faceplate and can collect dust and other debris. If the ink and debris are not removed from the faceplate, then the residual ink and debris may block one or more openings in the faceplate. Additionally, ink can dry within the nozzles of the inkjets and make the inkjets inoperative. As used in this document, the term "inoperative inkjet" means an inkjet that no longer ejects ink drops, ejects ink drops having a reduced volume, or ejects ink drops that deviate from the normal between the nozzle of an inkjet and the ink drop receiving surface opposite the inkjet. When the number of inoperative inkjets reaches a level adversely impacting the quality of the printed images, printhead cleaning is typically performed with a printhead maintenance station, which has a printhead cleaning module for each printhead in a printhead module.

A printhead maintenance station is mounted within the printer chassis and is configured to move the printhead cleaning modules in the station relative to the printheads of a printhead module for cleaning. Some printhead cleaning modules include a pressure source that when applied to the ink manifold in a printhead forces ink through the inkjets and nozzles in the printhead. This purged ink oozes onto the faceplate of the printhead and a wiper then moves across the faceplate of the printhead to direct the purged ink into a waste ink receptacle. Some printhead cleaning modules also include an applicator that applies a non-volatile solvent on the faceplate to liquefy the dried purged ink. Then, one or more wipers move across the faceplates to help spread the solvent and remove the dissolved debris and ink from the faceplate. As used in this document, the term "printhead cleaning module" means an assembly having at least one component that is used to preserve or remediate the operational status of a printhead. Such components include caps, wipers, solvent applicators, and the like. As used in this document, the term "printhead maintenance station" means an assembly of printhead cleaning modules configured to clean the printheads within a printhead module.

Previously known printhead maintenance stations typically include a base plate configured to hold one or more printhead cleaning modules, each of which usually contains a waste ink receptacle and one or more wiping blades. The base plate is usually positioned adjacent to the path that the media follows as it moves past the printheads. The printhead cleaning modules are arranged on the base plate in a pattern that conforms to the positions of the printheads in the printhead module that is cleaned by the printhead maintenance station. Actuators are operated to move the base plate of the printhead maintenance station in the cross-process direction so the printhead cleaning modules of the printhead maintenance station cross the media path. When the printhead cleaning modules reach the positions opposite the printheads of a printhead module, the actuators cease movement of the base plate. For example, FIG. 6 shows three printhead cleaning modules 504A, 504B, and 504C in a printhead maintenance station 500. When the printheads of a printhead module are to be cleaned, the base plate of the printhead maintenance station is moved in the cross-process direction as shown by the arrow in the figure until the three printhead cleaning modules of the printhead maintenance station are opposite the three printheads of the printhead module. Thus, the storage space required for the printhead maintenance station within the printer must have a length in the cross-process direction that is at least equal to the length of the array of printheads in the printhead module to be cleaned by the station in the cross-process direction and this space is located adjacent to the path of the media. Consequently, the printhead maintenance stations take up space adjacent to the print zone of a printer that is at least as wide as the media path. Reducing the footprint of printhead maintenance stations within an inkjet printer would help reduce the footprint of a printer on a floor in a printing facility.

SUMMARY

A printhead maintenance station is configured to be stored within the print zone of an inkjet printer and reduce the footprint of the printer. The printhead maintenance station includes at least one printhead cleaning module configured to be positioned within a print zone of a printer at a first position that is not between any printhead and a media transport path in the inkjet printer, and an actuator configured to move the at least one printhead cleaning module from the first position to a second position where the at least one printhead cleaning module is between at least one printhead and the media transport path in the inkjet printer.

An inkjet printer includes a printhead maintenance station configured to be stored within the print zone of an inkjet printer and reduce the footprint of the printer. The inkjet printer includes a media transport configured to move media along a media transport path through the inkjet printer, at least one printhead configured to eject drops of ink onto the media as the media transport moves the media past the at least one printhead, at least one printhead cleaning module positioned within a print zone of the inkjet printer at a first position where the at least one printhead cleaning module is not interposed between the media transport and the at least one printhead, and an actuator configured to move the at least one printhead cleaning module from the first position to a second position where the at least one printhead cleaning module is interposed between the at least one printhead and the media transport.

BRIEF DESCRIPTION OF THE DRAWINGS

The foregoing aspects and other features of a more compact printhead maintenance station and printer incorporating such a maintenance station are explained in the following description, taken in connection with the accompanying drawings.

DETAILED DESCRIPTION

Figure 1:
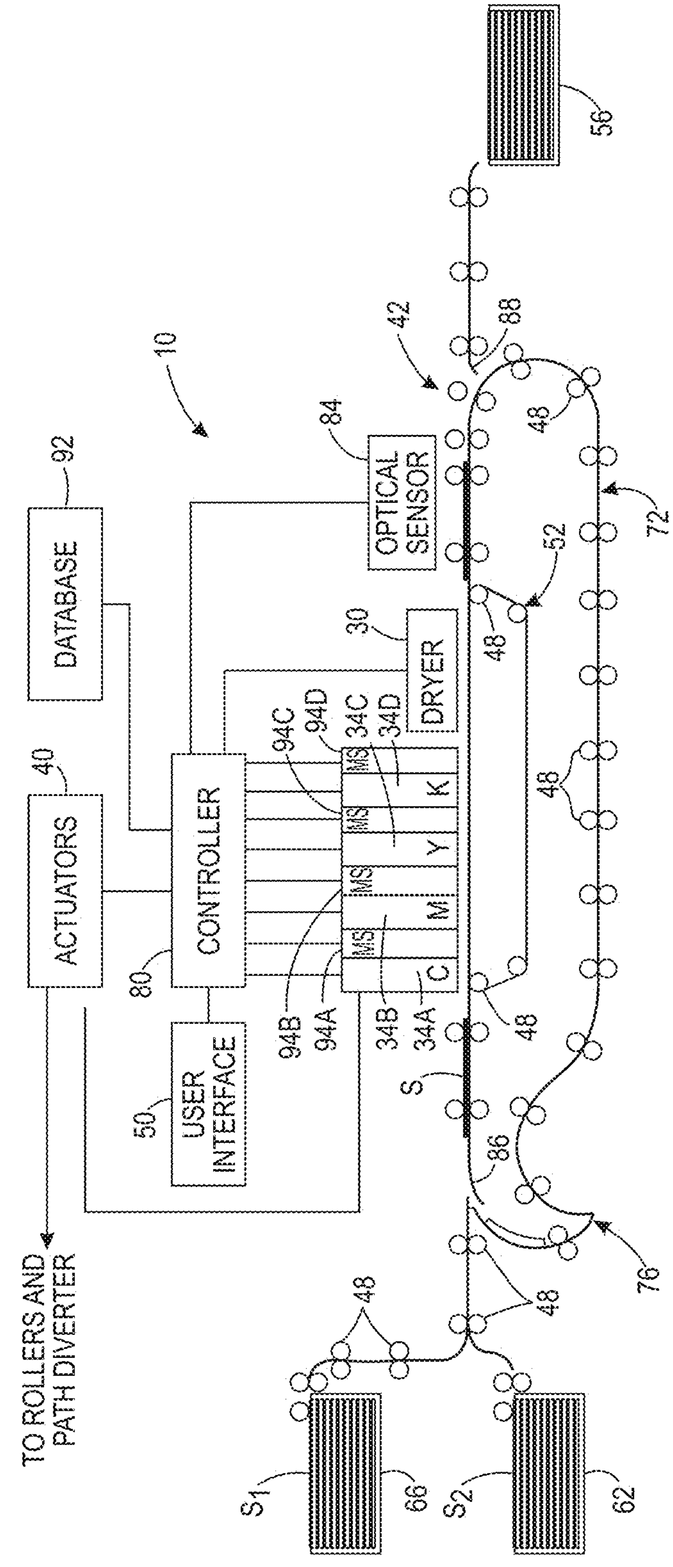
FIG. 1 is a schematic drawing of a color inkjet printer that is configured with a printhead maintenance station having a reduced footprint.

For a general understanding of the environment for the printer and the printhead maintenance station in the printer disclosed herein as well as the details for the printer and the printhead maintenance station, reference is made to the drawings. In the drawings, like reference numerals have been used throughout to designate like elements. As used herein, the word "printer" encompasses any apparatus that ejects ink drops onto media to form ink images.

The printer described below includes one or more printhead maintenance stations that are configured on a curved rack and pinion system with an actuator that is operated to move the printhead cleaning modules of the printhead maintenance station in a vertical direction to deploy the printhead cleaning stations opposite the printheads in a printhead module. This new storage configuration enables the printhead maintenance station to be positioned within the print zone of the printer. As used in this document, the term "vertical" means an arrangement of objects in which at least one object in the arrangement is positioned at a gravitational potential that is different than another object in the arrangement. As used in this document, the term "print zone" means of a volume that encompasses the printheads in a printer and an area of a media transport path that is opposite the printheads in a printer and, as used in this document, the term "media transport path" means the route of media from a storage receptacle in the printer to a final repository of the printed media in the printer before being removed from the printer.

FIG. 1 depicts a high-speed color inkjet printer 10 that is configured with maintenance stations 94A, 94B, 94C, and 94D for the printhead modules 34A, 34B, 34C, and 34D, respectively. Each maintenance station stores the printhead cleaning modules vertically to enable the maintenance station to be located in the print zone with the printheads. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer. In embodiments of the printer, the printhead modules have a plurality of printheads with each printhead having a width that is less than a width of the widest media in the cross-process direction that the printer can print. In these modules, the printheads are arranged in a staggered array that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
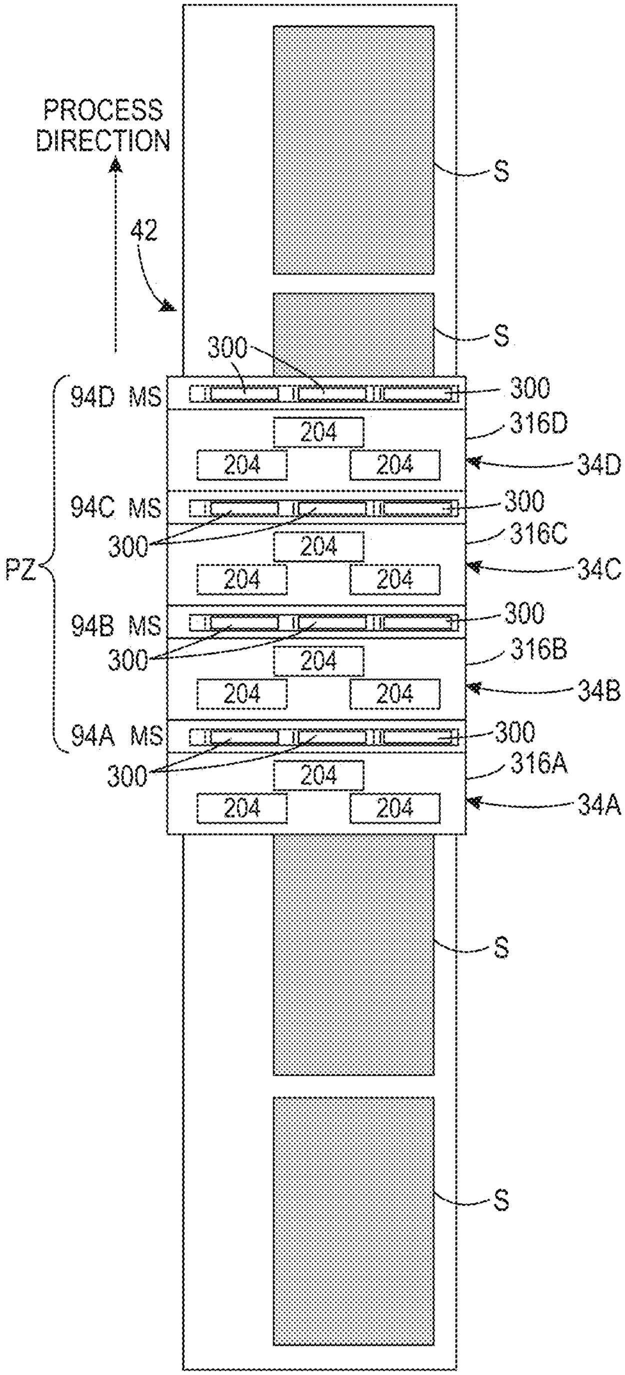
FIG. 2 depicts the print zone in the printer of FIG. 1.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. Although the printheads are staggered so the center printhead is offset from the other two printheads in the process direction, the ends of the printheads are positioned so the printheads of the module can print a continuous line of pixels that extend in the cross-process direction across passing media when all of the inkjets in the three printheads are operated. Each of the printhead modules 34A, 34B, 34C, and 34D has a corresponding maintenance station 94A, 94B, 94C, and 94D that follows the printhead module in the process direction. The configuration and operation of the maintenance systems are described in more detail below.

As shown in FIG. 1, the printed image passes under an image dryer 30 after the ink image is printed on a sheet S.

The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and move it by the rotation of rollers in an opposite direction to the direction of movement past the printheads. At position 76 in the duplex path 72, the substrate can be turned over so it can merge into the job stream being carried by the media transport 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Periodically, sheets in the job stream are printed with test pattern images during execution of a print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the media transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, the programmed instructions and data stored in their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, media speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 3A:
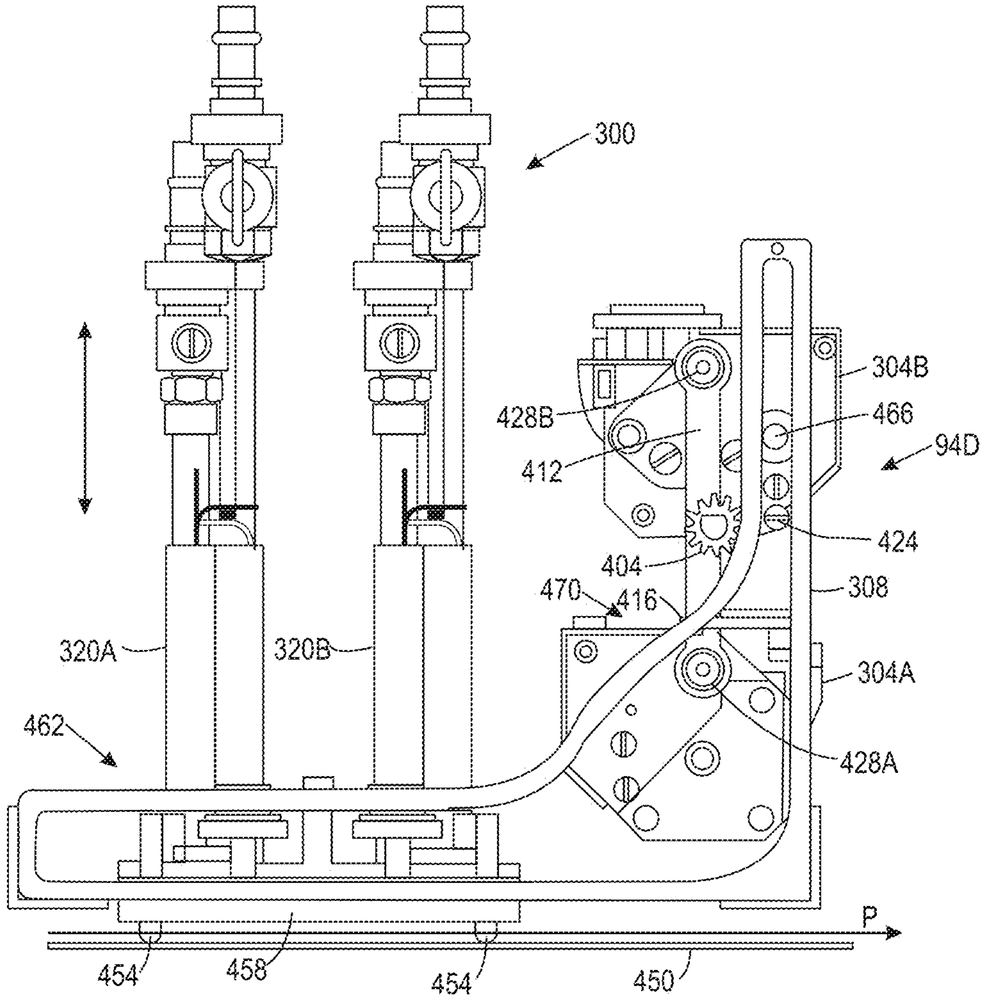
FIG. 3A, FIG. 3B, FIG. 3C, FIG. 3D, and FIG. 3E are end views of a printhead maintenance station showing different stages of the operation of the maintenance station 94D shown in FIG. 1 and FIG. 2.
Figure 3B:
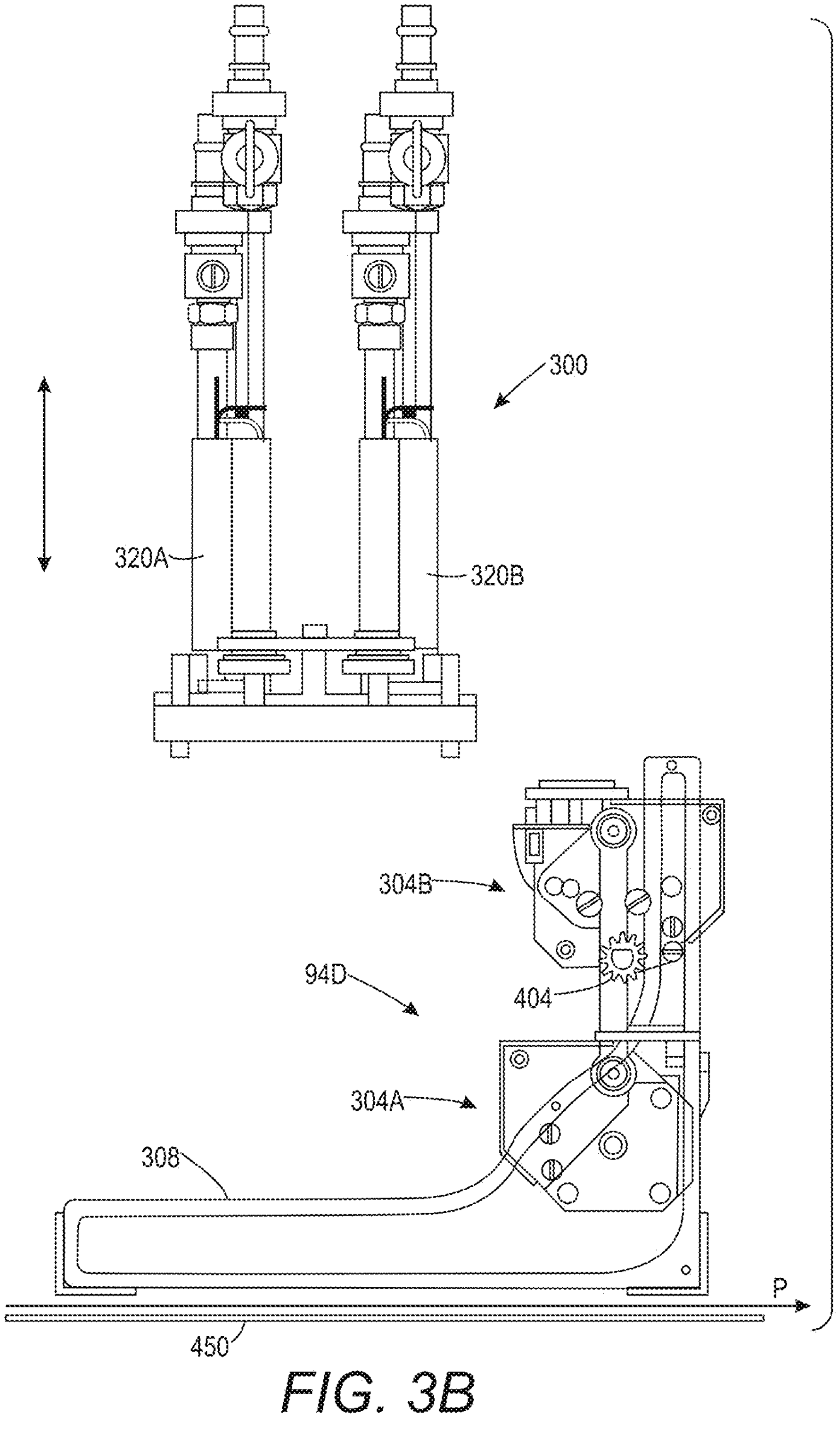

FIG. 3A shows an end view of the printhead cleaning modules 304A and 304B stored vertically in a printhead maintenance station 94D that is positioned within the print zone of an inkjet printer. The reader should appreciate that similar structure is shown on an opposite end of the printhead maintenance station as the printhead cleaning modules span the width of the printhead to be serviced by the printhead cleaning module in the cross-process direction. To simplify the description, only two printhead cleaning modules 304A and 304B and two printheads 320A and 320B of the printhead module 300 are shown to simplify the discussion. The two printheads 320A and 320B are aligned in the process direction P, are mounted to a carrier plate 458, and extend across the width of the print zone in the cross-process direction. The carrier plate 458 has a pair of adjustable standoffs 454 on each end. Each standoff 454 is threaded and rotatably mounted in a threaded hole in the carrier plate 458. The standoffs are rotated in the threaded holes to level the bottom surface of the carrier plate and fix the distance between the faceplates of the printheads and the media support platen 450. The printheads are configured to be moved bidirectionally in the vertical direction as indicated by the double-headed arrow in the figure. During printing operations, media sheets are passed along the length of platen 450 and receive ink drops ejected by the printheads onto the media.

Figure 3C:
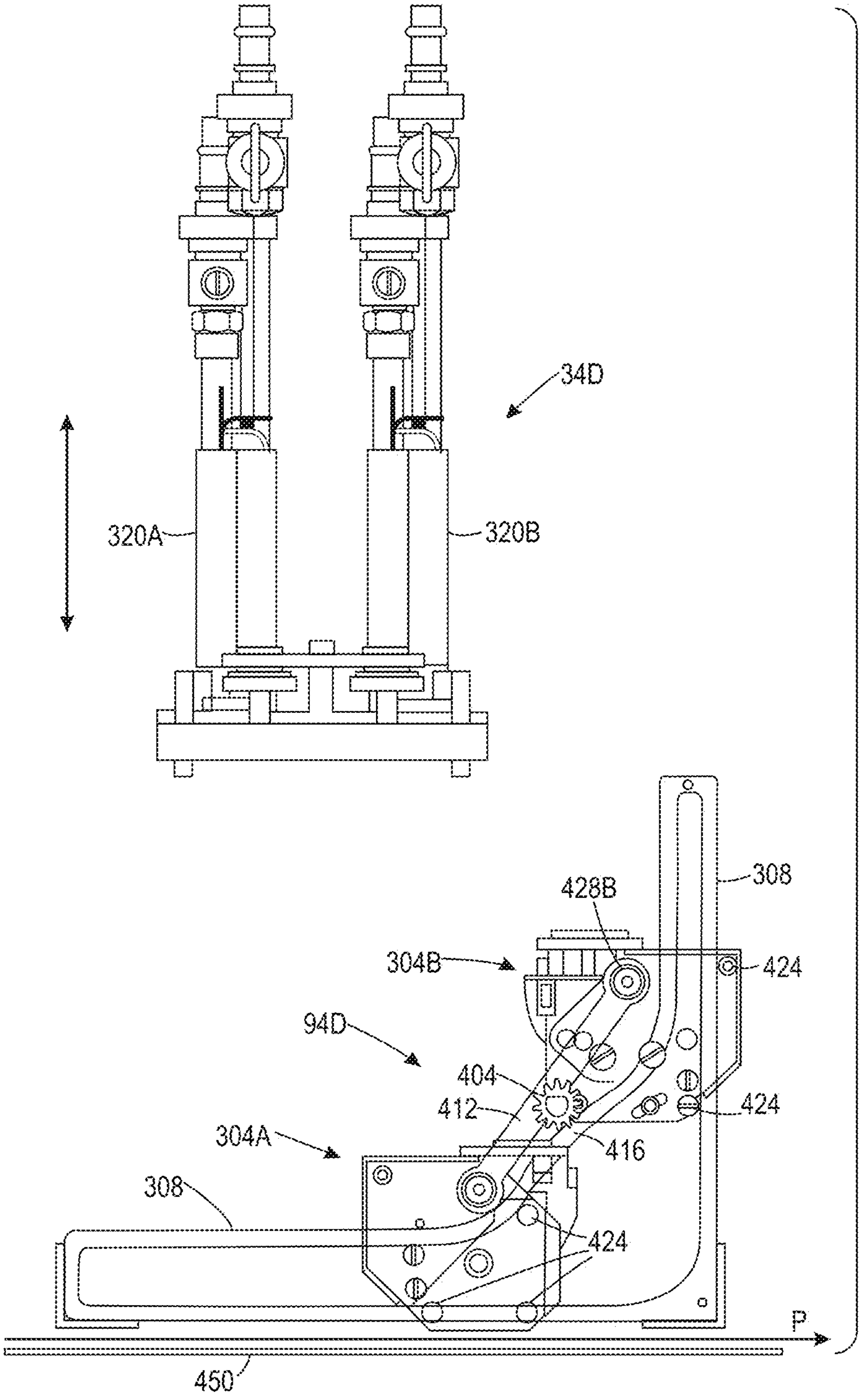
Figure 3D:
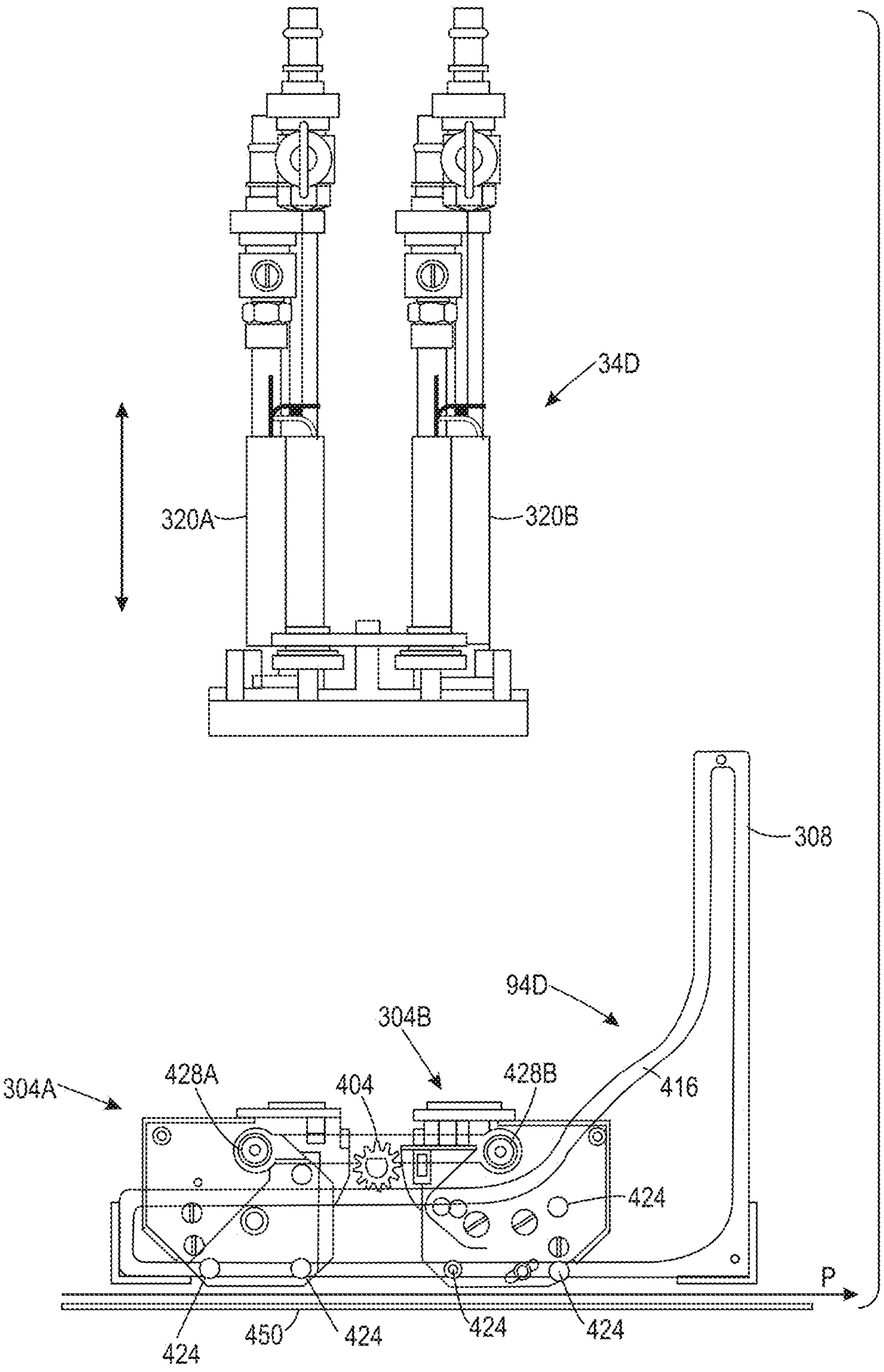
Figure 3E:
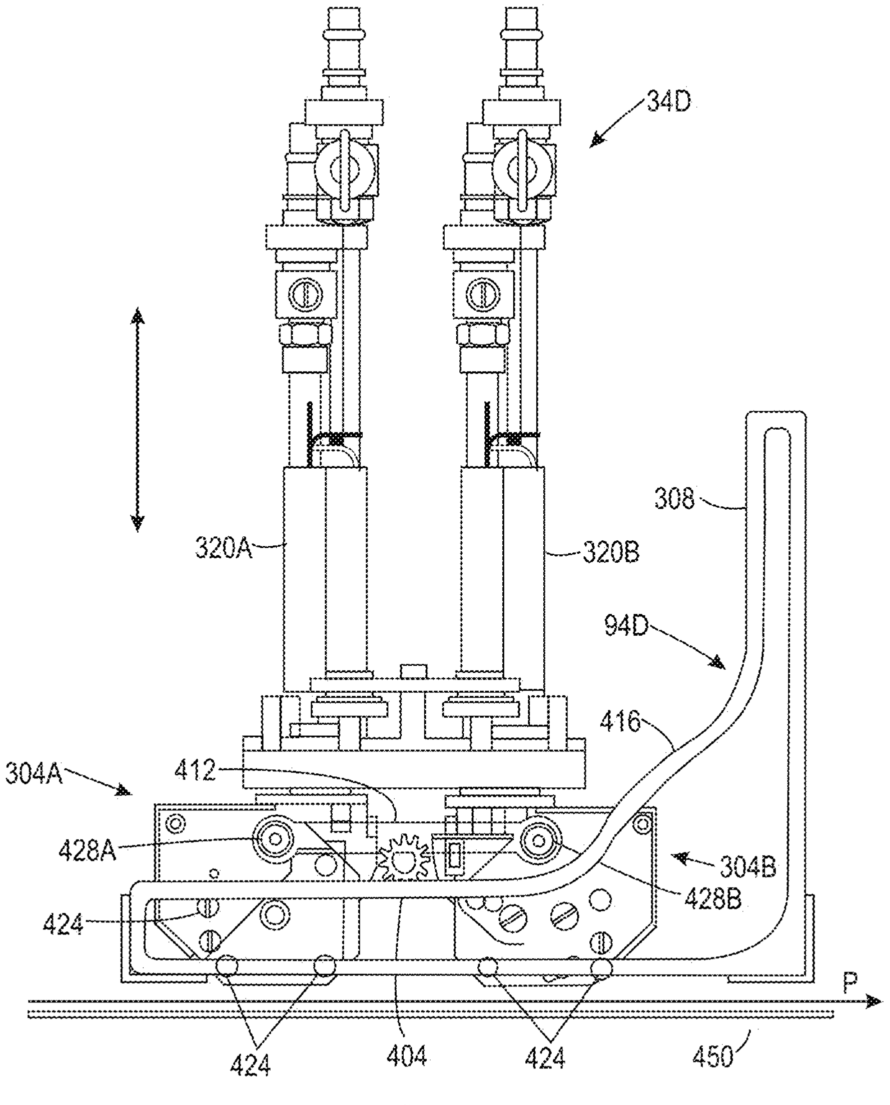

Printhead cleaning modules 304A and 304B are vertically arranged within the printhead maintenance station 94D by the interaction of an actuator and pinion 404 with a rack 416 formed in the outer surface of track 308 as described more fully below with reference to FIG. 4A. As used in this document, the term "track" means a structural member configured to form a path for movement of an object. As shown in FIG. 3A to FIG. 3E, the track 308 is a frame having a horizontal portion 462, a vertical portion 466, and curved portion 470 that connects the horizontal portion 462 and the vertical portion 466. The rack 416 is a series of teeth formed on the outside of the track 308 that extends from the vertical portion 466 to the horizontal portion 462. As used in this document, the term "vertical portion" means a portion of the track that deviates from the horizontal by an angle of at least 30 degrees to 90 degrees. The printhead cleaning modules 304A and 304B are held at a position that does not interfere with the movement of media sheets through the print zone even though they are located within the print zone and follow the printheads in the process direction P. When maintenance is to be performed on the printheads, an actuator is operated by the controller 80 to raise the printheads to the position shown in FIG. 3B. Then the controller 80 operates another actuator to rotate the pinion 404 in a counterclockwise direction to move the printhead cleaning modules 304A and 304B along the rack 416 on the track 308 as shown in FIG. 3C until they reach a horizontal position as shown in FIG. 3D. At that position, the printhead cleaning modules 304A and 304B are opposite the printheads 320A and 320B, respectively, of printhead module 300. The printhead module 300 is then lowered to mate the printheads 320A and 320B with the printhead cleaning modules 304A and 304B, respectively, for maintenance of the printheads (FIG. 3E). After the printhead maintenance, the printheads are lifted from the printhead cleaning modules and the actuator of the printhead maintenance station 300 rotates the pinion 404 in a clockwise direction to move the printhead cleaning modules 304A and 304B along the rack 416 on the track 308 until they are vertically arranged within the printhead maintenance station 300 when the actuator stops rotating the pinion. The printheads 320A and 320B are then lowered to the position shown in FIG. 3A to resume printing.

Figure 4A:
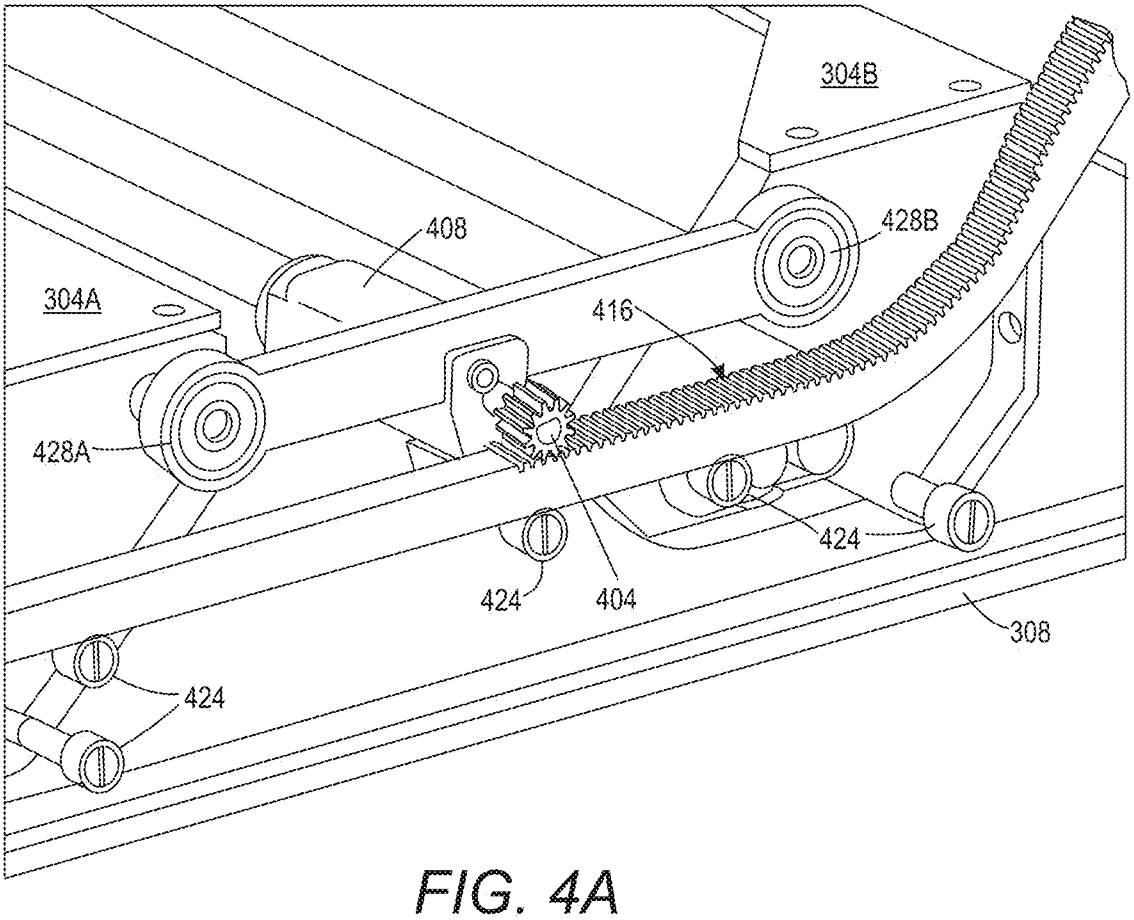
FIG. 4A shows the components of the maintenance station 94D in greater detail and FIG. 4B shows the path for the pinion, the cleaning modules, and the cam-followers of the cleaning modules shown in FIG. 4A.
Figure 4B:
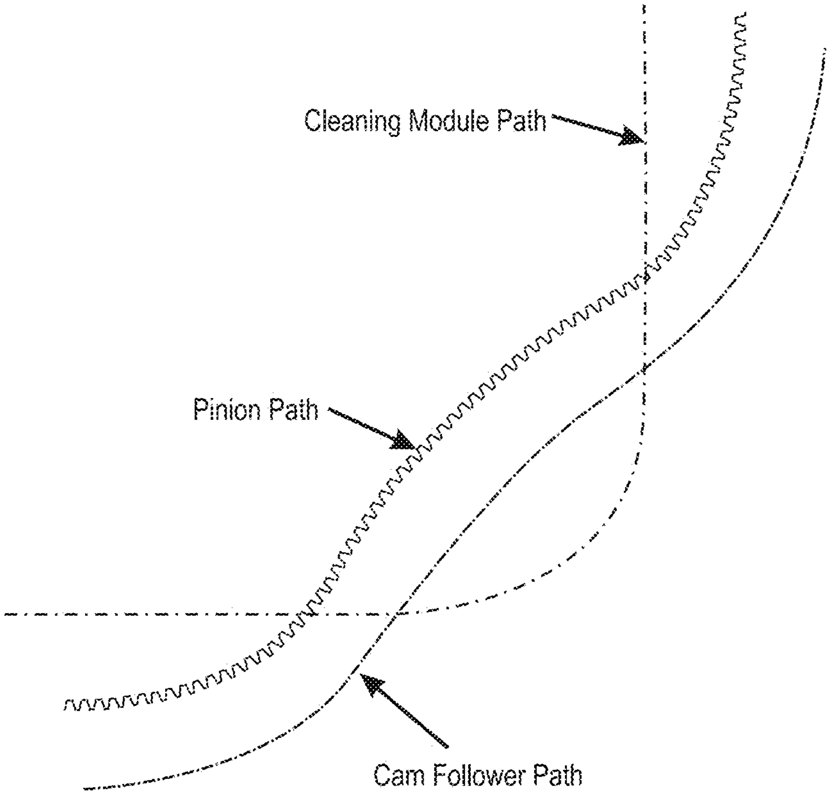

The mechanism for moving the printhead cleaning modules 304A and 304B is shown in more detail in FIG. 4A. The closed track 308 is formed with a rack 416 in its outer surface. An actuator 408, such as an electrical motor, has a driveshaft that extends through a link 412 and a pinion 404 is mounted to the end of the driveshaft so rotation of the driveshaft by the actuator also rotates the pinion. A portion of the teeth of the pinion 404 engages the rack 416 and link 412 is rotatably mounted about pivot pins 428A and 428B to secure the printhead cleaning modules 304A and 304B to one another. The actuator 408 is operatively connected to the controller 80 so the controller can operate the actuator to rotate the pinion in the clockwise and counterclockwise directions selectively. Cam-followers 424 are mounted to the printhead cleaning modules 304A and 304B at positions that enable them to engage the inner surface of the track 308, which is the side of the track that is opposite the rack 416. When the controller operates the actuator 408 to rotate the pinion 404 in the clockwise direction, the cam-followers 424 track along the inner surface of the track 308 and the printhead cleaning modules descend the track. The rotation of each end of link 412 about the pivot pins 428A and 428B enables the printhead cleaning modules to follow the cleaning module path as shown in FIG. 4B while the pinion 404 moves along the pinion path defined by the rack 416 as shown in FIG. 4B and the cam-followers 424 move along the cam-follower path defined by the track 308 as shown in FIG. 4B.

In the embodiment of the print zone shown in FIG. 1 and FIG. 2, each of the printhead maintenance stations 300 has a single printhead cleaning module. When the actuator 408 of each printhead maintenance station is operated to deploy its printhead cleaning module, the printhead cleaning module descends the rack 416 on the track 308 as described above until it is positioned opposite the printhead that precedes the printhead cleaning module in the process direction. Thus, the horizontal portion of the track 308 is longer for the inboard and outboard printhead maintenance stations than the horizontal portion of the track for the center printhead maintenance station to enable the printhead cleaning modules of the stations to reach a position opposite the printheads that precede them in the process direction.

Figure 5A:
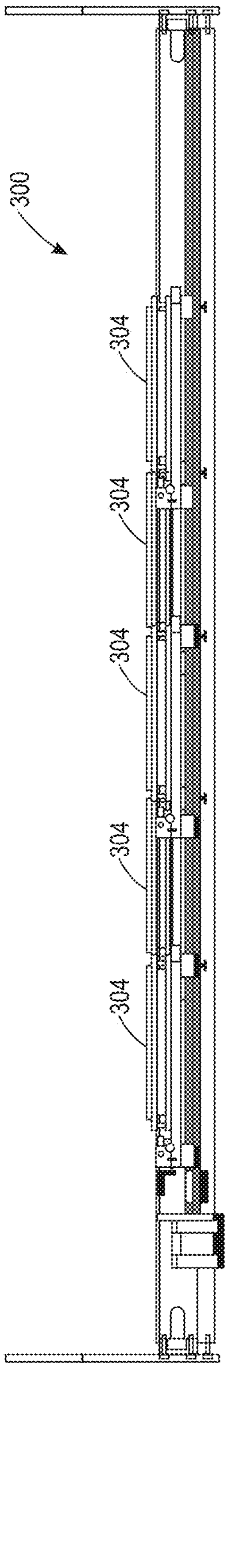
FIG. 5A is a side view of an alternative embodiment of a printhead maintenance station configured to clean a printhead module having six printheads in a staggered array.
Figure 5B:
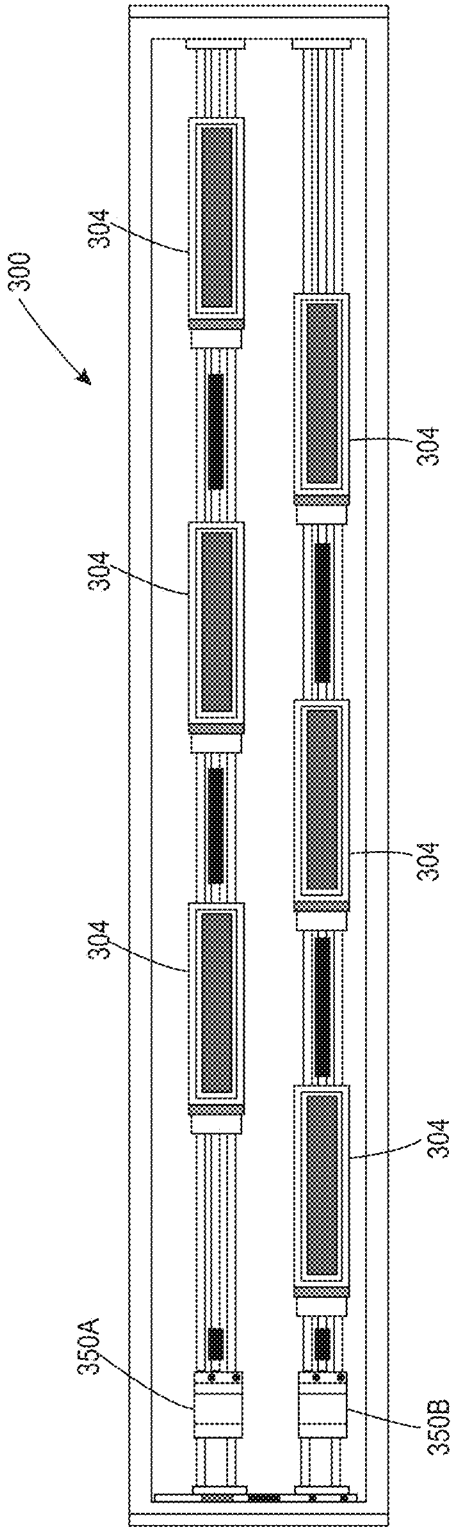
FIG. 5B is a top view of the alternative embodiment shown in FIG. 5A.
Figure 6:
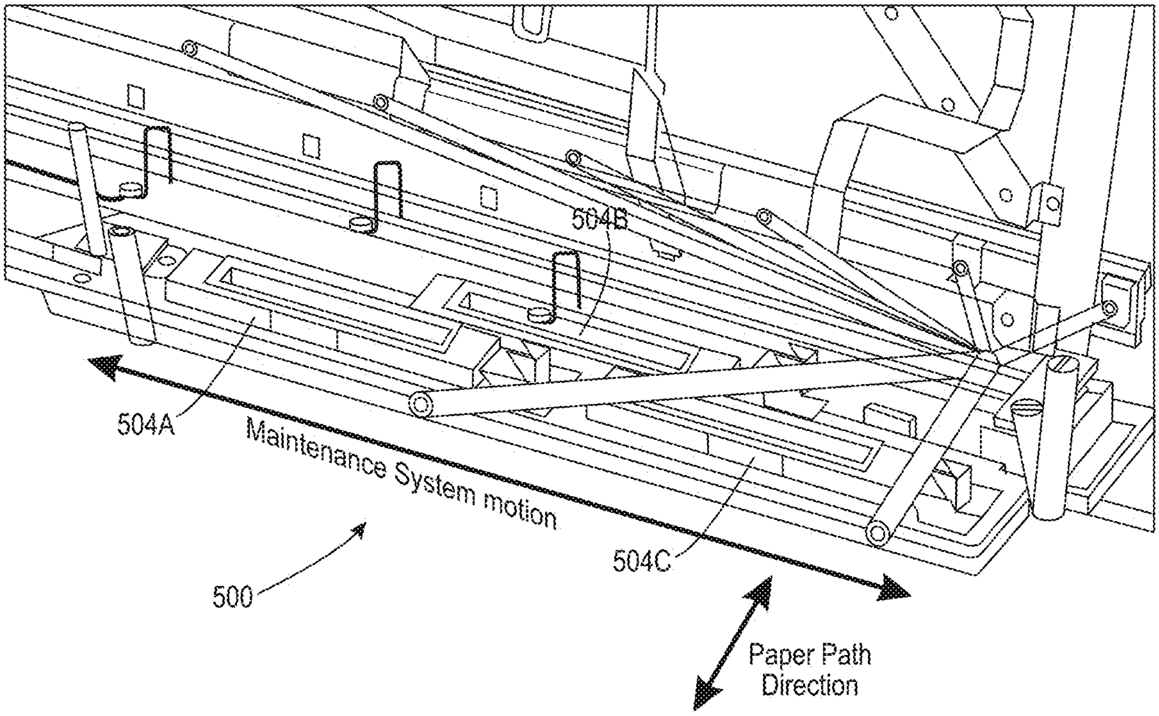
FIG. 6 Prior Art
FIG. 6 depicts the direction of movement of a prior art maintenance station for servicing the printheads of a printhead module.

In another alternative embodiment, a printhead maintenance station 300 is configured with six printhead cleaning modules 304 as shown in FIG. 5A and FIG. 5B. The printhead cleaning modules 304 are arranged to correspond with a printhead module having six printheads configured in a staggered array. The printhead maintenance station 300 is positioned after the printhead module in the process direction and an actuator 408 is operated to move each end of the printhead maintenance station along the track to position the printhead cleaning modules underneath the printhead module as described above so the six printhead cleaning modules are opposite the faceplates of the six printheads in the printhead module. The printhead module is then lowered onto the six printhead cleaning modules 304 and the printheads are cleaned. The printhead maintenance station 300 is configured with actuators 350A and 350B, which the controller 80 operates to move the three printhead cleaning modules of one row in the direction indicated by the arrow in the figure and to move the remaining three printhead cleaning modules of the other row in the opposite direction indicated by the second arrow in the figure. A wiper associated with each printhead cleaning module wipes the faceplate of the printhead that was purged while the printhead was positioned over the corresponding printhead cleaning module. When the wiper has traveled the length of the faceplate, the controller operates an actuator 40 to lift the printhead module and the actuator 408 of the printhead maintenance station is operated to return the printhead maintenance station to its elevated position so the printhead module can be returned to the printing position opposite the media path.

While the description of the printhead maintenance station has been limited to the positioning of printhead cleaning modules within a print zone of an inkjet printer, the principles of this printhead maintenance station can be extended to the positioning and deployment of other components in an inkjet printer. In one embodiment, these other components are printheads. For example, other printheads could be substituted for the printhead cleaning modules. These printheads could eject other types or colors of ink than those typically used in the printer. When these other ink types are required for a print job, the printheads typically used could be lifted out of their printing positions and the printheads stored in the station structure deployed in the manner described above for the printhead cleaning modules to place them where they can print media with the other types of ink. When the print job is finished, these printheads are returned to their storage position and the typically used printheads lowered for printing another print job.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printhead maintenance station for inkjet printer comprising:

at least one printhead cleaning module configured to be positioned within a print zone of a printer at a first position that is not between any printhead and a media transport path in the inkjet printer; and an actuator configured to move the at least one printhead cleaning module from the first position to a second position where the at least one printhead cleaning module is between at least one printhead and the media transport path in the inkjet printer.

2. The printhead maintenance station of claim 1 further comprising:

a track having an inner surface and an outer surface;

a rack formed on a portion of the outer surface of the track; and a pinion operatively connected to the actuator, the pinion being configured to move along the rack when the actuator is operated to rotate the pinion and move the at least one printhead cleaning module from the first position to the second position.

3. The printhead maintenance station of claim 2 wherein the pinion is mounted to a shaft driven by the actuator.

4. The printhead maintenance station of claim 3 wherein the at least one printhead cleaning module is a first printhead cleaning module and a second printhead cleaning module, the second printhead cleaning module being positioned at a higher gravitational potential than the first printhead cleaning module at the first position.

5. The printhead maintenance station of claim 4 further comprising:

a link having a first end and a second end, the link being configured to couple together the first printhead cleaning module and the second printhead cleaning module and the driveshaft driven by the actuator extends through the link to the pinion.

6. The printhead maintenance station of claim 5 further comprising:

a first pivot pin that extends from the first printhead cleaning module and through the first end of the link so the first end of the link rotates about the first pivot pin; and a second pivot pin that extends from the second printhead cleaning module and through the second end of the link so the second end of the link rotates about the second pivot pin.

7. The printhead maintenance station of claim 6, the track further comprising:

a first vertical portion;

a second horizontal portion;

a third curved portion that connects the first vertical portion to the second horizontal portion; and wherein the rack is formed on at least a portion of the first vertical portion, a portion of the second horizontal portion, and the third curved portion.

8. The printhead maintenance station of claim 7 further comprising:

at least one cam-follower mounted to the first printhead cleaning module; and at least one other cam-follower mounted to the second printhead cleaning module, each cam-follower being configured to move along the inner surface of the track.

9. The printhead maintenance station of claim 8, the first printhead cleaning module further comprising a wiper; and the second printhead cleaning module including a wiper.

10. An inkjet printer comprising:

a media transport configured to move media along a media transport path through the inkjet printer;

at least one printhead configured to eject drops of ink onto the media as the media transport moves the media past the at least one printhead;

at least one printhead cleaning module positioned within a print zone of the inkjet printer at a first position where the at least one printhead cleaning module is not interposed between the media transport and the at least one printhead; and an actuator configured to move the at least one printhead cleaning module from the first position to a second position where the at least one printhead cleaning module is interposed between the at least one printhead and the media transport.

11. The inkjet printer of claim 10 further comprising:

a track having an inner surface and an outer surface;

a rack formed on a portion of the outer surface of the track; and a pinion operatively connected to the actuator, the pinion being configured to move along the rack when the actuator is operated to rotate the pinion and move the at least one printhead cleaning module from the first position to the second position.

12. The inkjet printer of claim 11 wherein the pinion is mounted to a shaft driven by the actuator.

13. The inkjet printer of claim 12 wherein the at least one printhead cleaning module is a first printhead cleaning module and a second printhead cleaning module and the at least one printhead is a first printhead and a second printhead, the second printhead cleaning module being positioned at a higher gravitational potential than the first printhead cleaning module when the first printhead cleaning module and the second printhead cleaning module are at the first position.

14. The inkjet printer of claim 13 further comprising:

a link having a first end and a second end, the link being configured to couple together the first printhead cleaning module and the second printhead cleaning module and the driveshaft driven by the actuator extends through the link to the pinion.

15. The inkjet printer of claim 14 further comprising:

a first pivot pin that extends from the first printhead cleaning module and through the first end of the link so the first end of the link rotates about the first pivot pin; and a second pivot pin that extends from the second printhead cleaning module and through the second end of the link so the second end of the link rotates about the second pivot pin.

16. The inkjet printer of claim 15, the track further comprising:

a first vertical portion;

a second horizontal portion;

a third curved portion that connects the first vertical portion to the second horizontal portion; and wherein the rack is formed on at least a portion of the first vertical portion, a portion of the second horizontal portion, and the third curved portion.

17. The inkjet printer of claim 16 wherein the second horizontal portion of the track is parallel to and at a higher gravitational potential than the media transport.

18. The inkjet printer of claim 17 further comprising:

at least one cam-follower mounted to the first printhead cleaning module; and at least one other cam-follower mounted to the second printhead cleaning module, each cam-follower being configured to move along the inner surface of the track.

19. The inkjet printer of claim 18, the first printhead cleaning module further comprising a wiper; and the second printhead cleaning module further comprising a wiper.

20. An inkjet printer comprising:

a media transport configured to move media along a media transport path through the inkjet printer;

at least one printhead configured to eject drops of ink onto the media as the media transport moves the media past the at least one printhead;

at least one component configured to be positioned within a print zone of the inkjet printer at a first position that is not between the media transport and the at least one printhead; and an actuator configured to move the at least one component from the first position to a second position where the at least one component is between the at least one printhead and the media transport.

* * * * *